United States Patent Office 3,585,054
Patented June 15, 1971

3,585,054
GLASS-CERAMIC ARTICLE AND METHOD
Bruce R. Karstetter, Painted Post, N.Y., assignor to Corning Glass Works, Corning, N.Y.
No Drawing. Continuation-in-part of abandoned application Ser. No. 365,179, May 5, 1964. This application Nov. 25, 1968, Ser. No. 778,788
Int. Cl. C03c 3/22
U.S. Cl. 106—39     3 Claims

ABSTRACT OF THE DISCLOSURE

This invention relates to the strengthening of glass-ceramic articles wherein the crystal content thereof comprises the predominant portion and having crystals containing magnesium, aluminum, and silicon ions selected from the group consisting of cordierite, enstatite, spinel, and quartz solid solutions constituting the principal crystal phases. The strengthening is effected through an ion exchange reaction carried out within a surface layer of the glass-ceramic article wherein lithium ions from an external source are exchanged for magnesium ions in the crystal phase to cause the crystals in this surface layer to be transformed to beta-eucryptite or beta-spodumene, this transformation resulting in the surface layer having a lower coefficient of thermal expansion than the interior portion of the article and thereby creating an integral surface compression layer in the article.

---

This application is a continuation-in-part of my pending application, Ser. No. 365,179, filed May 5, 1964, now abandoned.

The production and the physical characteristics of glass-ceramic articles are discussed in detail in U.S. Pat. No. 2,920,971 and reference is made to that patent for a more extensive study. However, in brief, the production of glass-ceramic articles involves three primary steps. A glass-forming batch commonly containing a nucleating agent is melted. The melt is simultaneously cooled to a glass and an article of a desired configuration shaped therefrom. Finally, this glass shape is subjected to a special heat treating schedule such that nuclei are first formed in the glass which provides sites for the growth of crystals thereon as the heat treatment is continued. This heat treatment, then, causes the glass article to crystallize in situ.

The structure imparted to a glass-ceramic article through the crystallization in situ on innumerable nuclei comprises relatively uniformly-sized, fine-grained crystals homogeneously dispersed in a residual glassy matrix, the crystals constituting the majority portion of the article. Hence, glass-ceramic articles are commonly stated to be at least 50% by weight crystalline and, frequently, are actually over 90% by weight crystalline. Because of this very high crystallinity, glass-ceramic articles normally exhibit chemical and physical properties quite different from those of the parent glass and which are more nearly characteristic of a crystalline article. Furthermore, the very high crystallinity of glass-ceramic articles results in a residual glassy matrix having a composition much different from that of the parent glass since the constituents comprising the crystals will have been precipitated therefrom.

The crystal phases which will be developed in a glass-ceramic article are dependent upon the composition of the parent glass and the particular heat treatment schedule to which the glass is subjected. The present invention involves glass-ceramic articles produced through the heat treatment of $MgO-Al_2O_3-SiO_2$ glass articles in such a manner to precipitate out such crystal phases as spinel, enstatite, stuffed beta-quartz, and cordierite.

The diffusion of ions in any medium is a direct function of the structure of the medium itself. Hence, whereas a crystal has a long range ordered structure of ions, glass has only short range order and has even been deemed to consist of a random network of ions. This basic difference in structure affects greatly the ability of ions to diffuse therein.

The structure of glass is characterized by a network or framework composed of polyhedra of oxygen centered by small ions of high polarizing power (e.g. $Si^{+4}$, $B^{+3}$, $Al^{+3}$, $Ge^{+4}$, $P^{+5}$). These polyhedra are arranged in a generally random fashion so that only short range order exists. Thus silica glass is thought to be composed of a random network of $SiO_4$ tetrahedra, all of whose corners are shared with one another. In silicate glasses containing modifying oxides (e.g. $Na_2O$, $K_2O$, $MgO$, $CaO$, $BaO$, etc.) some of the shared corners (Si—O—Si bonds) are believed broken and oxygen ions are formed which are connected to only one silicon ion. The modifying ions remain in interstitial positions or structural vacancies. In modified aluminosilicate glasses, non-bridging oxygen ions are believed less common because as modifying ions are added to silicate glasses aluminum replaces silicon in the three-dimensional corner shared tetrahedral network and the modifying ions remain in the interstices with the retention of charge balance.

In either case the larger ions of lower valence (modifiers) are thought to occur geometrically in interstitial positions within the basic silicate or aluminosilicate framework. They can thus be considered as completely or at least partially surrounded by linked framework silica tetrahedra. In other words, these ions can be considered as present in "structural cages" in the network.

Since the glassy network is random, the size of these cages or potential modifier cation positions is variable and the number of cages is large with respect to the number of modifying ions. Therefore, it is likely that during ion exchange in a molten salt bath a small ion will jump out of a cage and a large ion will jump into another cage, very possibly a larger one. Even if the exchangeable ion in the glass and the ions in the molten salt are similar in size, it is likely that an ion leaving one cage will be replaced by an ion entering a different and previously vacant cage. Thus ion exchange phenomena in a glassy network are structurally random and there is no guarantee that certain structural vacancies or positions filled before exchnge will be filled after exchange.

The concept of exchanging ions within a crystal structure has been appreciated for many years. The term "ion exchange," as commonly used, refers to replacement reactions in clay and zeolite-type materials carried out in aqueous solutions at temperatures below 100° C. These materials generally consist of alternating, parallel, essentially two-dimensional layers which are stacked together with interlayer spaces therebetween. To maintain electroneutrality between these layers, cations are incorporated into the interlayer spaces. The extent and rate of exchange in these materials is a function not only of the concentrations of the exchanging species but also of the structure of the crystalline phase undergoing exchange. When these materials are suspended in an aqueous solution which can penetrate between the layers, these cations are freely mobile and can exchange with cations present in the solution. Hence, the cation exchange capacity of these materials arises principally from the replacement of cations at defined positions in the interlayer spaces. These interlayer spaces can be likened to channels and it will be apparent that this type of low temperature ion exchange will occur between the loosely bonded ions in a crystal and those in a solution only if there is a suitable channel within the crystal to allow diffusion to take place.

Isomorphous substitution in crystals involves the replacement of the structural cations within the crystal lattice by other cations. This type of substitution may be regarded as a form of ion exchange but the accomplishment thereof requires crystallizing the materials from melts of the appropriate composition. However, the amount and type of isomorphous substitutions can often be very important in affecting the character of a material which is to be subsequently subjected to the conventional low temperature ion exchange reaction described above.

The instant invention contemplates the use of high temperature ion exchange to effect substitutions within the crystalline lattice to thereby produce materials similar to those secured through isomorphous substitution. However, in contrast to glasses, high temperature ion exchange in crystals is much more restricted. The various ion species are specifically located in defined positions within the lattice. When an ion leaves a crystalline position, the position is generally filled by another ion from an external source of ions. The geometry of the crystals often restricts the size of the replacing ion. Isomorphous substitutions in the crystal can only sometimes be of help in determining which ion pairs are exchangeable under the rigid conditions imposed by the long range repetitive order of crystals. Thus, for example, sodium ions can replace lithium ions in the beta-spodumene crystal structure but this exchange cannot take place in the beta-quartz or beta-eucryptite solid solution structure where the sodium ion appears to be too large for the structure to tolerate and the crystalline structure is destroyed if the exchange is forced to take place. As opposed to this, the sodium-for-lithium ion exchange can always be carried out in aluminosilicate glasses without any phase change.

Hence, in short, crystals, because of their definite geometry, impose stringent limitations upon ion exchange. Glasses, on the other hand, because they are random structures capable of incorporating almost all chemical species in a substantial degree, demonstrate no such basic restrictions.

Of course, the ability of a crystalline phase to accept another cation to replace an ion already in its structure through an ion exchange mechanism is not necessarily useful. Many such exchanges will not lead to compressive stress and consequent strengthening. When strength is the desired goal, it is necessary to tailor the exchange to produce compressive stress in the exchanged layer. The compressive stress may arise through crowding of the existing structure or through transformation of that structure to one which comes under compression by some other mechanism; e.g., difference in coefficients of thermal expansion or density changes.

An application, Ser. No. 365,117 entitled "Glass-Ceramic Article and Method," filed May 4, 1964 in the name of R. O. Voss, now abandoned, and assigned to a common assignee, discloses the general principles of ion exchange within the crystal phase of a glass-ceramic material containing exchangeable ions. This application also specifically discloses that glass-ceramic materials containing a beta-spodumene crystal phase are capable of having the lithium ion of such crystal phase exchanged for a larger ion within a surface layer on the article, thereby developing a compressively stressed surface layer that greatly increases the strength of the article. This specific exchange occurs without apparent transformation of the crystal phase.

My application entitled "Glass-Ceramic Article and Method," filed Sept. 30, 1968, Ser. No. 763,966, discloses and claims the exchange of lithium ions for sodium ions in the surface layer of glass-ceramic articles containing a nepheline crystal phase. It further discloses that the resulting lithium-ion-containing crystal will undergo transformation to a new crystal phase by either simultaneous or subsequent thermal treatment at a relatively high temperature. It is further disclosed that such crystal transformation results in a compressively stressed surface layer that materially strengthens the article on cooling.

Glass-ceramic materials are customarily identified in terms of the major or predominant crystal phase of phases which develop during their production. In turn, these crystal phases are normally given the name of the corresponding crystal previously identified in natural or single crystal form. In order to avoid confusion, it must be recognized that crystals may form a series or family of solid solutions wherein all members of the family will exhibit a corresponding pattern of peaks by X-ray diffraction analysis, but with the posibility of slight differences in spacing or intensity of such peaks. This situation will frequently occur in glass-ceramic materials, and it is the practice to designate all members of such a series or family by the name of the corresponding known crystal or crystal family.

The term "beta-eucryptite" has been used to designate a crystal in the trapezohedral class of the hexagonal system that has the formula $Li_2O \cdot Al_2O_3 \cdot 2SiO_2$ and is a high temperature form of alpha eucryptite. In lithium-aluminum-silicate glass-ceramic materials, however, the crystal phase does not strictly conform to a naturally occurring crystal. Rather, it is more in the nature of a solid solution corresponding generally to the formula $Li_2O \cdot Al_2O_3 \cdot nSiO_2$ where "$n$" may vary from about 2 up to 7 or more depending on the silica content of the parent glass. There is also evidence to indicate that other ions, in particular the magnesium ions, may enter the crystal structure to some extent if present in the parent glass. However, the characteristic geometric pattern of the crystal, as shown by X-ray diffraction pattern analysis, invariably falls in the trapezohedral class of either the hexagonal or tetragonal system. Accordingly, it has become customary, in identifying glass-ceramics, to essentially disregard stoichiometry and to term those lithium-aluminum-silicate crystal phases that are classifiable in the trapezohedral class of the hexagonal system as beta-eucryptite crystal phases or as stuffed beta-quartz solid solution phases since the structure is basically the same as that of beta-quartz. Those that are classifiable in the trapezohedral class of the tetragonal system are referred to as beta-spodumene crystal phases. That practice is followed here.

Where the oxide stoichiometry in the crystal is such that the coefficient "$n$" is between 2 and about 3.5 in the formula $Li_2O \cdot Al_2O_3 \cdot nSiO_2$ a stable beta-eucryptite type crystal phase is normally observed to occur. Where the proportion of silica in the composition is sufficiently large to permit formation of a crystal in which the "$n$" value may be greater than about 3.5, the stable crystal form is a beta-spodumene type, although a beta-eucryptite type crystal of a metastable nature may develop at lower temperatures. This metastable crystal normally transforms into the beta-spodumene crystal with heat treatment at temperatures on the order of 900° C. and higher. However, even where "$n$" is greater than 3.5, the beta-eucryptite (stuffed beta-quartz) structure may be stabilized relative to the beta-spodumene structure by the presence of certain contaminating ions. Magnesium ions function in such a manner since the beta-quartz structure can form more extensive solid solutions with $Mg(AlO_2)_2$ than can the beta-spodumene structure. Zinc oxide and some others have a similar effect.

I have now found that the magnesium ion in an $$MgO—Al_2O_3—SiO_2$$

type glass-ceramic can be caused to exchange with two lithium ions. Furthermore, I have found that, when such exchange takes place in the presence of alumina and silica, a concurrent crystal phase transformation occurs whereby either a beta-eucryptite or beta-spodumene type crystal phase or a combination of both is formed. In accordance with the earlier discussion, the nature of the crystal phase formed is normally dependent on the amount of silica available to enter into the crystal, and the extent to which magnesia is removed from the parent material.

Experience has shown, that with the oxides of magnesium, aluminum and silicon present in a glass composition, a number of different crystal phases may develop depending on the oxide proportions existent in the composition, the nucleating agent involved, and the temperature schedule employed to produce the glass-ceramic. However, I have found that, regardless of the particular crystal phases originally formed, the exchange of magnesium and lithium ions can be effected and will result in a transformation to a lithium-aluminum-silicate type crystal phase.

My invention then is a glass-ceramic article in which the original crystal phase or phases contain, as essential oxides, the oxides of magnesium, aluminum and silicon, and the article is characterized by a surface layer containing a lithium aluminosilicate type crystal phase. The invention further includes a method of chemically altering at least a portion of the crystal phase in a glass-ceramic article containing oxides of magnesium, aluminum, and silicon in the crystal phase or phases which comprise bringing the glass-ceramic article into contact with a material containing an exchangeable lithium ion to effect an exchange of magnesium and lithium ions and the consequent development of lithium aluminosilicate type crystal phases.

As employed in this application, the expression "exchangeable lithium ion" refers to a lithium ion which can diffuse or migrate to a finite depth in a material under the combined activation of a chemical force such as differential ion concentration and a physical force such as heat and/or an electrical potential.

The invention is of particular utility as a means of increasing the strength of a glass-ceramic article wherein the original glass-ceramic material has a relatively high thermal coefficient of expansion. Since the lithium-aluminum-silicate crystal phases have relatively low coefficients of expansion, the effect of the phase transformation to a lithium type crystal then is the production of a surface layer of relatively low expansion encasing or enclosing a central or core portion of the original relatively high expansion glass-ceramic material. When such an article cools, the expansion differential causes compressive stresses to develop in the low expansion surface layer with resultant strengthening of the article.

As indicated earlier, the oxides of magnesium, aluminum and silicon may occur in a variety of different crystal phases in a glass-ceramic material. When a glass composed essentially of these oxides and containing titania as a nucleating agent is converted to a glass-ceramic material at relatively low temperatures, e.g. 900–1000° C., such crystal phases as spinel (magnesium aluminate), enstatite (magnesium silicate), "stuffed" beta-quartz (e.g. a beta-quartz having aluminum substituted for silicon and containing interstitial magnesium ions for electrical balance) and magnesium dititanate tend to form. If the beta-quartz is not highly stuffed, i.e. a highly siliceous beta-quartz, it will often invert to the high expansion alpha-quartz upon cooling below about 500° C. However, if the maximum temperature in the ceramming schedule is somewhat higher, e.g. 1100–1300° C., there is a tendency for cordierite crystals to form as the principal phase, with cristobalite forming as a second phase in the presence of excess silica. In general, the glass-ceramic materials that form at the lower temperatures tend to have a relatively high thermal coefficient of expansion. In contrast, the tendency of a cordierite crystal phase to develop at higher temperatures normally results in a glass-ceramic having a markedly lower expansion coefficient.

For strengthening purposes then, it is generally preferable to employ a glass-ceramic produced at a relatively low temperature in order to attain as great an expansion differential as possible. It will be understood, however, that a low expansion cordierite-containing material will also undergo ion exchange, but that the degree of strengthening available is normally rather low because of the inherently low expansion characteristics of the parent material. In other words, there will be a relatively small expansion differential between the parent cordierite glass-ceramic and the lithium-containing material formed by ion exchange and crystal transformation on the surface with resulting small compressive stress development as the material cools.

In practice then, a suitable glass batch is formulated, mixed and melted. The glass is then shaped to desired form by casting or other suitable means. The glass article is then converted to the glass-ceramic state in accordance with a predetermined ceramming schedule selected to provide a desired expansion coefficient in accordance with the principles outlined above.

The glass-ceramic article thus provided is then contacted with a source of exchangeable lithium ions at a temperature and for a time suitable for effecting a given degree of ion exchange between the magnesium ions of the glass-ceramic and the lithium ions of the contacting material. Concurrently, with such exchange a crystal transformation occurs whereby either beta-eucryptite or beta-spodumene or, occasionally, a combination of the two crystal types form.

The ion exchange may occur at a temperature at least as low as 600° C. However, for strengthening purposes, I prefer to employ a temperature in the range of 900°–1000° C. At these temperatures, a time on the order of 16–30 hours is required to approach a maximum degree of tumble abraded strength in accordance with the invention. It will, of course, be understood that lesser times and/or lower temperatures may be employed where the attainment of the maximum degree of strengthening is not required.

Although the invention is not so limited, immersion of a glass-ceramic article in a molten salt bath of lithium sulfate has been found to be a convenient means of effecting the desired ion exchange. This lithium salt melts at about 860° C. and has been successfully employed at temperatures up to 1050° C.

The exact mechanism whereby crystal transformation takes place is not clear at the present time. However, it does result in a distinctly different crystal structure and ionic arrangement, and appears to occur concurrently with the ion exchange. As pointed out earlier, it is known that beta-spodumene crystal formation occurs when the silica content is relatively high in a lithium-aluminum-silicate glass-ceramic, whereas the beta-eucryptite crystal tends to form at lower silica levels. Which phase is formed will also depend to a large extent upon the presence of other stuffed ions such as magnesium ions. While the line of demarcation is not necessarily as sharp in the present crystal transformation case, the same general tendencies appear to prevail.

The invention is further described with reference to several specific embodiments thereof.

The following table sets forth three glass formulations on an oxide basis in parts by weight.

|  | 1 | 2 | 3 |
|---|---|---|---|
| $SiO_2$ | 56.2 | 49.7 | 48.3 |
| $Al_2O_3$ | 19.8 | 27.3 | 18.8 |
| $MgO$ | 14.5 | 12.8 | 21.9 |
| $TiO_2$ | 9.1 | 9.9 | 10.0 |
| $As_2O_3$ | 0.4 | 0.4 |  |
| $Na_2O$ |  |  | 1.0 |

Glass batches were prepared from raw materials such as sand, alumina, and magnesia, the materials being selected and proportioned on the basis of the above formulations. Each glass was melted at a temperature of 1550–1600° C. for a time of about 16 hours to provide a homogeneous melt from which glass articles were formed. For strength testing purposes, quarter-inch diameter cane samples were drilled from cast bodies of glass in the case of compositions 1 and 2, and drawn in the case of composition 3.

The cane samples were then converted to the glass-ceramic state in accordance with a variety of different ceramming schedules, and sets of samples, produced in accordance with each schedule, were subjected to various ion exchange treatments to determine relative strengthening effects. As indicated above, a molten salt bath of lithium sulfate was used for ion exchange purposes.

After removal of the cane samples from the salt bath and cleaning, each ion exchanged cane sample was subjected to a severe form of surface abrasion wherein cane samples were mixed with 200 cc. of 30 grit silicon carbide particles, and subjected to a tumbling motion for 15 minutes in a Number 0 ball mill jar rotating at 90–100 r.p.m. Each abraded cane sample was then mounted on spaced knife edges in a Tinius Olsen testing machine and a continuously increasing load applied opposite and intermediate of the supports until the cane broke in flexure. From the measured load required to break each cane, a modulus of rupture (MOR) value was calculated for the individual cane and an average value determined for each set of samples. This value was taken as the tumble abraded strength of the sample set.

Inasmuch as the mechanical strength of these glass-ceramic articles is a function of the surface compression layer developed thereon by means of the ion exchange reaction and, whereas virtually all service applications for these articles will result in surface injury thereto even if only that sustained during normal handling and shipping, the permanent or practical strength exhibited by these articles is that which is demonstrated after substantial surface abrasion thereof. Hence, the above-described tumble abrasion test was improvised to simulate the surface abuse which glass-ceramic articles could experience in actual field service. In order to secure reasonably good abraded strength to the articles, the depth of the surface compressively stressed layer should, preferably, be at least 0.001″. This depth can be measured through electron microscope examination of a cross-section of the article.

The various ceramming schedules, ion exchange schedules, and strengths obtained are summarized in the following examples.

EXAMPLES 1–3

Three sets of cane from the melt of glass 1 were converted to the glass-ceramic state by heat treating in accordance with the following schedule:

Heat at 210° C./hour to 820° C.
Hold 2 hours at 820° C.
Heat at 210° C./hour to 1260° C.
Hold 8 hours at 1260° C.

The structure of the crystallized cane samples was examined employing X-ray diffraction analysis accompanied with replica and transmission electron micrographs. The cane samples were found to be greater than about 70% crystalline by weight with cordierite constituting the predominant crystal phase. The presence of alpha-cristobalite was also observed but the total thereof was less than about 25% of the crystalline material. The average coefficient of thermal expansion of the cane, obtained in the conventional manner (0°–300° C.), was determined to be about $52 \times 10^{-7}/°$ C. and the average tumble abraded MOR of the cane was about 15,000 p.s.i.

The sets of cane were immersed in a molten lithium sulfate bath operating at a temperature of 950° C. One set was removed after 16 hours; a second set after 24 hours; and the third set after 49 hours. After abrasion in accordance with the procedure described earlier, the tumble abraded MOR for the first set was $36.9 \times 10^3$ p.s.i.; the second set was $42.3 \times 10^3$ p.s.i.; and $42.0 \times 10^3$ p.s.i. for the third set.

This invention is grounded upon the exchange of lithium ions for magnesium ions in the crystal structure of the magnesium-containing crystal phases present. That such an exchange does, indeed, take place in the cordierite crystals is confirmed through X-ray diffraction analysis of the surface crystals in the cane before and after the ion exchange reaction wherein cordierite plus cristobalite is transformed into beta-spodumene or stuffed beta-quartz, depending probably upon the extent to which magnesium is replaced by lithium. Thus, at the surface where the exchange is essentially complete, beta-spodumene is the dominant phase. Deeper in the ion-exchanged layer, where significant magnesium remains in the composition, the dominant phase is beta-eucryptite (stuffed beta-quartz). This is illustrated by grinding off the first few microns of the exchanged layer in which beta-spodumene dominates. X-ray diffraction after such grinding shows a dominant phase of stuffed beta-quartz and no beta-spodumene. This transformation of cordierite plus cristobalite is evident in an examination of the following table which records several of the $d$-spacings and intensities observed thereat in an X-ray diffraction pattern made of the surface crystallization of Example 1 prior to and subsequent to the ion exchange reaction. The intensities are arbitrarily reported as very strong (v.s.), strong (s.), moderate (m.), and weak (w.).

| Before exchange | | 100% Li₂SO₄ 24 hours at 950° C. | | After surface grinding | |
|---|---|---|---|---|---|
| d | I | d | I | d | I |
| 8.50 | s. | 5.91 | w. | | |
| 4.90 | m. | 4.67 | m. | 4.57 | v.w. |
| 4.70 | w. | 3.95 | s. | 3.91 | v.w. |
| 4.11 | v.s. | 3.51 | v.s. | 3.50 | v.s. |
| 3.38 | s. | 3.27 | w. | 3.25 | m. |
| 3.25 | w. | 3.20 | m. | 2.75 | w. |
| 3.14 | s. | 2.67 | w. | 2.50 | w. |
| 3.04 | s. | 2.31 | m. | 2.34 | m. |
| 2.65 | m. | 2.12 | w. | 2.10 | w. |
| 2.10 | m. | 1.98 | m. | 1.89 | v.s. |
| 1.84 | m. | 1.89 | s. | 1.74 | w. |
| 1.69 | m. | 1.70 | m. | 1.69 | m. |
| | | 1.65 | m. | 1.42 | s. |

This table clearly illustrates the change in crystal structure which the cordierite in the surface layer of the crystallized cane undergoes during the ion exchange process. Hence, the X-ray diffraction pattern exhibited by the outer surface crystals after the exchange with lithium ions is quite similar to that of beta-spodumene whereas the diffraction pattern demonstrated by the crystals in the compression layer below the outer surface is that of stuffed beta-quartz.

EXAMPLE 4

A set of cane samples produced from the melt of glass 1 was converted to the glass-ceramic state in accordance with the following schedule:

Heat 120° C./hour to 820° C.
Hold 2 hours at 820° C.
Heat 120° C./hour to 1010° C.
Hold 4 hours at 1010° C.
Cool in furnace.

X-ray diffraction analysis and electron microscope examination of the crystallized cane indicated crystal contents in excess of 70% by weight with the principal crystal phases consisting of alpha-quartz, enstatite, and spinel, with minor amounts of magnesium dititanate, the total of the minor phase being less than 15% of the crystalline material. The average tumble abraded strength of both sets of cane was about 13,000 p.s.i. The average coefficient of thermal expansion for the cane (0°–300° C.) was about $108 \times 10^{-7}/°$ C.

The cane samples were then immersed in bath of molten lithium sulfate operating at 950° for a period of 24 hours. The cane samples were removed from the bath, cleaned, and tumble abraded as described above. The average tumble abraded strength of the cane was about 130,000 p.s.i. X-ray diffraction analysis of the samples after the ion exchange treatment indicated beta-spodumene to constitute the vast majority of the surface crystallization. This conversion of the magnesium-containing crystal phases combined with siliceous quartz to beta-spodumene is clearly apparent from the X-ray data reported in the following table. It is apparent that the crystalline phase assemblage undergoes reaction concurrent with the ion exchange to form one new phase. Thus, this table, like that recorded above for Example 1, lists several of the $d$-spacings and the intensities observed thereat in an X-ray diffraction pattern made of the surface crystallization of Example 4 prior to and after the ion exchange reaction.

| Before exchange | | 100% $Li_2SO_4$ 950° C. for 24 hours | |
|---|---|---|---|
| d | I | d | I |
| 4.37 | m. | 5.79 | w. |
| 3.43 | v.s. | 4.98 | w. |
| 3.30 | w. | 4.87 | w. |
| 3.18 | w. | 4.57 | m. |
| 2.96 | w. | 3.92 | s. |
| 2.89 | m. | 3.48 | v.s. |
| 2.77 | m. | 3.15 | m. |
| 2.52 | m. | 2.87 | w. |
| 2.47 | m. | 2.75 | w. |
| 2.31 | w. | 2.64 | v.w. |
| 2.20 | w. | 2.53 | w. |
| 2.03 | m. | 2.50 | w. |
| 1.85 | s. | 2.46 | w. |
| 1.68 | m. | 2.41 | w. |
| 1.56 | m. | 2.30 | m. |
| 1.43 | m. | 2.26 | w. |
| 1.39 | m. | 2.19 | w. |
| | | 2.11 | m. |
| | | 1.97 | w. |
| | | 1.94 | m. |
| | | 1.88 | s. |
| | | 1.70 | w. |
| | | 1.65 | m. |
| | | 1.54 | m. |

This table amply demonstrates the change in crystal structure of the surface crystallization which attends the ion exchange process. Hence, the X-ray diffraction pattern made on the surface crystals of the glass-ceramic cane prior to the ion exchange reaction portrays the presence of alpha quartz, enstatite, spinel, and magnesium dititanate, whereas the X-ray diffraction pattern of the surface crystallization after the ion exchange reaction exhibits beta-spodumene as by far the predominant crystal phase. As in the case with Example 1, if the surface layer is removed by grinding, X-ray diffraction analysis shows that the bulk of the ion-exchanged strengthened layer is actually a stuffed beta-quartz structure. Since both lithium aluminosilicate phases exhibit low coefficients of thermal expansion, the strength is little affected by which of the two phases is present or in what proportions they may both be present.

EXAMPLE 5

A further set of cane samples from glass 1 was converted to the glass-ceramic state by the following heat treatment:

Heat 120° C./hour to 820° C.
Hold 2 hours at 820° C.
Heat 240° C./hour to 995° C.
Hold 4 hours at 995° C.
Cool 60° C./hour to 600° C.
Cool rapidly.

It was observed that these cane samples had about the same crystal content, the same crystal phases as those of Example 4, and a similarly high coefficient of thermal expansion, although the values varied somewhat due to the different heat treatments. The average abraded MOR was about 14,000 p.s.i.

Three sets of cane samples cerammed in accordance with the above schedule were immersed in a lithium sulfate bath operating at 950° C. with one set being removed at the end of 24 hours; another set at the end of 48 hours; and the third set at the end of 72 hours. The first set had an average abraded MOR of 113,400 p.s.i.; the second set a value of 142,500 p.s.i.; and the third set a value of 145,700 p.s.i. These data, coupled with other corresponding data, indicate that optimum tumble abraded strength is attained at times of 16–30 hours at an ion exchange temperature of 950° C.

EXAMPLE 6

A further set of glass samples of glass 1 was immersed directly in a lithium sulfate salt bath at 950° C. without any preliminary thermal treatment. The cane samples were removed after 24 hours, cleaned, tumble abraded, and their strength measured as indicated above. The average MOR for this set of samples was 105,500 p.s.i. and the cane, comprising greater than 70% by weight crystals, were found to have crystal phases developed corresponding to those observed in the cane samples of Examples 4–5 above, viz., a surface layer containing beta-spodumene as the principal crystal phase and an interior portion wherein magnesium-containing crystals constitute the principal crystal phase. This indicates that the initial ceramming step and the ion exchange plus crystal transformation step can be combined and carried out simultaneously. However, ware treated in this manner tends to distort rather badly and such combined operation must take this factor into account.

EXAMPLE 7

A set of glass cane samples was prepared from a melt of glass 2 and converted to the glass-ceramic state by heat treating in accordance with the following schedule:

Heat 210° C./hour to 805° C.
Hold 10 minutes at 805° C.
Heat 210° C./hour to 1300° C.
Hold 1 hour at 1300° C.
Heat 4° C./hour to 1370° C.
Hold 2 hours at 1370° C.
Cool in furnace.

Because of its lowered silica content, this composition is closer to the cordierite stoichiometry than that of the prior examples and the samples cerammed with this high temperature schedule showed cordierite as the only major crystalline phase with a minor rutile phase, the crystallization being in excess of 70% by weight. The thermal coefficient of expansion of the glass-ceramic material was about $14 \times 10^{-7}/$° C. (0°–300° C.) and the abraded MOR about 15,000 p.s.i.

The glass-ceramic cane samples were immersed into a lithium sulfate bath operating at 950° C. for periods of time greater than 48 hours but no substantial increase in abraded MOR was observed, the highest increase being about 5,000 p.s.i. It was believed that this absence of a substantial improvement in strength was due to the lack of a considerable difference in expansion coefficient between the cordierite crystals of the interior portion of the cane and the lithium aluminosilicate phase of the surface layer. Nevertheless, the transformation of the cordierite to a stuffed beta-quartz with a trace of lithium metasilicate can be seen in the following table reporting several of the $d$-spacings and the intensities observed thereat in an X-ray diffraction pattern made of the surface crystallization before and after the ion exchange reaction.

| Before exchange | | 100% Li₂SO₄ 950° C. for 48 hours | |
|---|---|---|---|
| d | I | d | I |
| 8.84 | v.s. | 5.10 | m. |
| 5.01 | s. | 4.72 | s. |
| 4.77 | m. | 4.46 | s. |
| 4.17 | v.s. | 4.15 | v.w. |
| 3.43 | v.s. | 3.66 | v.w. |
| 3.30 | s. | 3.48 | v.s. |
| 3.18 | v.s. | 3.40 | v.w. |
| 3.06 | v.s. | 3.00 | v.w. |
| 2.67 | s. | 2.59 | w. |
| 2.52 | m. | 2.50 | s. |
| 2.48 | w. | 2.36 | m. |
| 2.46 | w. | 2.08 | w. |
| 2.36 | m. | 2.04 | m. |
| 2.30 | w. | 1.89 | v.s. |
| 2.24 | w. | | |
| 2.22 | w. | | |
| 2.12 | m. | | |
| 2.07 | w. | | |
| 1.96 | w. | | |
| 1.89 | m. | | |
| 1.81 | w. | | |
| 1.70 | v.s. | | |

This table clearly shows the change in crystal structure which the cordierite crystals in the surface layer of the cane undergo during ion exchange with lithium ions. Hence, the X-ray pattern made of the surface crystals after the ion exchange reaction closely approximates that exhibited by a stuffed beta-quartz solid solution (beta-eucryptite).

EXAMPLE 8

A further set of samples of glass 2 was converted to the glass-ceramic state by heat treatment in accordance with the following schedule:

Heat 210° C./hour to 830° C.
Hold 2 hours at 830° C.
Heat 210° C./hour to 990° C.
Hold 4 hours at 990° C.
Cool 90° C./hour to 400° C.
Cool rapidly.

X-ray diffraction analysis accompanied with electron microscope examination of the crystallized cane demonstrated products greater than 70% by weight crystalline with alpha-quartz, enstatite, and spinel constituting the principal crystal phases with very minor amounts of magnesium titanate, totalling less than 15% of the crystalline material. The average coefficient of thermal expansion of the cane (25°–300° C.) was determined to be about $69.9 \times 10^{-7}/°$ C. and the average abraded MOR was determined to be about 14,000 p.s.i.

The set of crystallized cane samples was immersed into a bath of lithium sulfate operating at 950° C. for a period of 24 hours. The samples were removed from the bath, cleaned, and tumble abraded as described above. The average MOR was determined to be about 116,800 p.s.i. This illustrates the remarkable difference in strengthening that can occur depending upon the nature of the initial ceramming treatment. X-ray diffraction analysis of the cane after the ion exchange treatment demonstrated that beta-eucryptite comprised the principal phase of the surface crystallization with a trace of beta-spodumene and lithium metasilicate. Thus, as in Example 7, it is believed that the transformed crystal phase is predominantly beta-eucryptite on the surface rather than beta-spodumene as in Example 1 because of the lower silica content of the glass. The X-ray data of the following table illustrates the conversion of the magnesium-containing crystals in the surface layer of Example 9 to beta-eucryptite occurring during the ion exchange reaction.

| Before exchange | | 100% Li₂SO₄ 950° C. for 24 hours | |
|---|---|---|---|
| d | I | d | I |
| 4.87 | w. | 4.65 | w. |
| 4.46 | m. | 4.53 | s. |
| 3.40 | v.s. | 3.92 | w. |
| 3.14 | w. | 3.49 | v.s. |
| 2.91 | w. | 2.61 | m. |
| 2.87 | m. | 2.49 | v.s. |
| 2.70 | m. | 3.25 | v.w. |
| 2.49 | m. | 2.26 | m. |
| 2.45 | w. | 2.09 | m. |
| 2.41 | w. | 2.08 | m. |
| 2.23 | w. | 1.89 | v.s. |
| 2.15 | w. | 1.74 | w. |
| 2.05 | w. | 1.72 | w. |
| 1.93 | w. | 1.63 | v.s. |
| 1.85 | m. | | |
| 1.81 | w. | | |
| 1.61 | m. | | |

This table is believed to fully demonstrate that the magnesium ion-containing crystals obtained in the surface of the crystallized cane are converted to low expansion lithium aluminosilicate phases during the ion exchange reaction. Thus, before exchange, the X-ray diffraction pattern of the surface crystals exhibits the presence of enstatite, spinel, alpha-quartz, and rutile whereas, after exchange, the X-ray diffraction pattern of the surface crystallization indicates the vast majority of the crystals to be stuffed beta-quartz solid solution (beta-eucryptite), with traces of beta-spodumene and lithium metasilicate.

EXAMPLE 9

A set of cane samples of glass 3 was prepared and converted to the glass-ceramic state by heat treatment in accordance with the following schedule:

Heat 300° C./hour to 820° C.
Hold 4 hours at 820° C.
Heat 300° C./hour to 1080° C.
Hold 3 hours at 1080° C.
Cool in furnace.

X-ray diffraction analysis and electron microscope examination of the glass-ceramic cane indicated several crystal contents in excess of 70% by weight with stuffed beta-quartz, enstatite, and spinel comprising the principal crystal phase with very minor amounts of magnesium dititanate and alpha-quartz. These minor phases total less than 15% of the crystalline material. The average tumble abraded strength was about 15,000 p.s.i. and the average coefficient of thermal expansion (25°–315° C.) was about $78.5 \times 10^{-7}/°$ C.

The cane samples were immersed into a bath of molten lithium sulfate operating at 950° C. for a period of 16 hours. The cane samples were then removed from the bath, cleaned, and tumble abraded as described above. The average tumble abraded strength of the cane samples was determined to be about 139,500 p.s.i. X-ray diffraction analysis of the surface crystallization manifested beta-eucryptite to be the principal crystal phase.

Although in the above 9 examples a bath of molten salt was utilized as the source of exchangeable lithium ions and that is the preferred origin for such ions, it can readily be appreciated that other sources of lithium ions can be employed which are useful at the temperatures operable in this invention. Hence, the use of pastes and vapors is well-recognized in the ion exchange staining arts. Further, it will be apparent that the most rapid rate of exchange and the highest strengths will commonly be affected where pure lithium ion-containing materials are utilized as the exchange medium although some contamination can be tolerated. However, the determination of the maximum amount of contamination that can be tolerated in the lithium ion source is believed to be well within the technical ingenuity of a person of ordinary skill in the art.

Since, as was observed above, the glass-ceramic articles of this invention are very highly crystalline, not only is the amount of residual glassy matrix small but the composition thereof is quite different from that of the parent glass. Thus, in the preferred embodiment of the invention, virtually all of the magnesium ions will be incorporated in the crystal structure of the magnesium ion-containing crystals present in the article leaving a residual matrix consisting primarily of silica. Some magnesium ions in excess of that included in the crystal phase can be tolerated but amounts greater than about 5% by weight in excess frequently yield a coarse-grained rather than the desired fine-grained product. It will be appreciated that these "contaminant" magnesium ions in the residual glassy matrix can also be exchanged with the lithium ions during the ion exchange reaction, but, it is equally apparent that since the number of such ions is small and the total content of residual glass in the article is very small, the overall effect of such an exchange upon the properties of the article would be substantially negligible when compared with the effect resulting from the exchange taking place within the crystals. Indeed, since lithium aluminosilicate glasses tend to be somewhat higher in expansion than magnesium aluminosilicate glasses, the effect of lithium for magnesium exchange in the residual glass would be to produce tension, thus weakening the product. From the results reported above, it is obvious that any such exchange in the residual glass is of little consequence.

Finally, since the ion exchange reaction providing the surface compression layer must necessarily occur within the crystals and, whereas magnesium ion-containing crystals comprise the principal crystal phase present, minor amounts of other crystals can also be present. Nevertheless, inasmuch as the existence of these extraneous crystals will dilute the maximum strengthening effect that can be attained where magnesium ion-containing crystals constitute the sole crystal phase, it is preferred to restrict the sum of all such incidental crystallization to less than about 20% of the total thereof.

It is readily apparent from the above description that the present invention provides a means of transforming the crystal phase of the surface layer of certain types of glass-ceramic materials and also of producing glass-ceramic articles having increased tumble abraded strengths. Numerous variations and modifications with respect to materials and conditions of treatment will become readily apparent and should, therefore, be considered to be within the scope of the appended claims.

I claim:

1. A unitary glass-ceramic article of high strength wherein the crystal content thereof constitutes at least 70% by weight of the article and having an integral surface compressive stress layer consisting essentially of beta-eucryptite and/or beta-podumene as the crystal phase derived from crystals originally present in said surface and selected from the group consisting of cordierite, enstatite, spinel, stuffed beta-quartz, and alpha-quartz and an interior portion consisting essentially of $MgO$, $Al_2O_3$, and $SiO_2$ wherein the crystal phase thereof consists essentially of crystals selected from the group consisting of cordierite, enstatite, spinel, stuffed beta-quartz, and alpha-quartz.

2. A method for making a unitary glass-ceramic article of high strength wherein the crystal content thereof constitutes at least 70% by weight of the article and having an integral surface compressive stress layer and an interior portion which comprises contacting a glass-ceramic article consisting essentially of $MgO$, $Al_2O_3$, and $SiO_2$ wherein the crystal phase thereof consists essentially of crystals selected from the group consisting of cordierite, enstatite, spinel, stuffed beta-quartz, and alpha-quartz at a temperature between about 900°–1050° C. with a source of exchangeable lithium ions for a period of time sufficient to replace at least part of the magnesium ions of said crystals in a surface layer of the article with lithium ions on a two lithium ions-for-one magnesium ion basis to convert said crystals to beta-eucryptite and/or beta-spodumene, thereby effecting a compressively stressed surface layer in the article.

3. A method according to claim 2 wherein said glass-ceramic article is contacted with a source of exchangeable lithium ions at a temperature between about 900°–1000° C. for a period of time ranging about 16–30 hours.

References Cited

UNITED STATES PATENTS

| | | | |
|---|---|---|---|
| 2,779,136 | 1/1957 | Hood et al. | 65—30X |
| 3,252,811 | 2/1966 | Beall | 65—33X |
| 3,282,770 | 11/1966 | Stookey et al. | 65—30X |
| 3,482,513 | 2/1969 | Denman | 65—33X |

S. LEON BASHORE, Primary Examiner

J. H. HARMAN, Assistant Examiner

U.S. Cl. X.R.

65—30, 33